US010991007B2

(12) United States Patent
Ta et al.

(10) Patent No.: US 10,991,007 B2
(45) Date of Patent: *Apr. 27, 2021

(54) AERIAL BILLBOARD

(71) Applicant: Productive Application Solutions, Inc., Sheridan, WY (US)

(72) Inventors: Peter Ta, Tucson, AZ (US); Gerald Maliszewski, San Diego, CA (US)

(73) Assignee: Productive Application Solutions, Inc., Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/023,546

(22) Filed: Sep. 17, 2020

(65) Prior Publication Data

US 2021/0004870 A1 Jan. 7, 2021

Related U.S. Application Data

(63) Continuation-in-part of application No. 17/007,575, filed on Aug. 31, 2020, which is a continuation of
(Continued)

(51) Int. Cl.
*G06Q 30/00* (2012.01)
*G06Q 30/02* (2012.01)

(52) U.S. Cl.
CPC ..... *G06Q 30/0266* (2013.01); *G06Q 30/0244* (2013.01); *G06Q 30/0252* (2013.01); *G06Q 30/0267* (2013.01)

(58) Field of Classification Search
CPC ........... G06Q 30/0244; G06Q 30/0252; G06Q 30/0267
(Continued)

(56) References Cited

U.S. PATENT DOCUMENTS 8,989,922 B2 3/2015 Jones et al.
9,076,336 B2 * 7/2015 Tippelhofer ........... G08G 1/148
(Continued)

FOREIGN PATENT DOCUMENTS

CN 210391576 4/2020
EP 737841 A1 * 10/1996 ............. F41H 11/02
(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski

(57) ABSTRACT

An aircraft media projection system is provided with a deployment subsystem having an interface to supply an enablement signal with an identification code, in response to an aircraft maintaining a selected midair position in the atmosphere above the ground. A location subsystem determines the midair geographic location of the aircraft, and a communications subsystem, typically a cellular link, has an interface to receive verification information including the enablement signal, identification code, and geographic location, and an interface to transmit the verification information to a server. In one aspect, the system may include a WiFi hotspot that is available for use by the public at large. A targeting software application permits the selection of the midair position from a plurality of potential midair positions. Each potential midair stationary position may have a corresponding weighted value. In another aspect, the system
(Continued)

may include a media projection subsystem to selectively project media.

18 Claims, 10 Drawing Sheets

Related U.S. Application Data application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(58) Field of Classification Search
USPC .......... 705/14.63, 14.62, 14.49, 14.4; 725/32
See application file for complete search history.

(56) References Cited

U.S. PATENT DOCUMENTS

| | | | | |
|---|---|---|---|---|
| 9,275,550 | B1 | 3/2016 | Stefani et al. | |
| 9,786,176 | B2 | 10/2017 | Northrup et al. | |
| 10,001,546 | B2 | 6/2018 | Gibson et al. | |
| 10,045,390 | B2 * | 8/2018 | Chong | H04W 4/06 |
| 10,109,224 | B1 * | 10/2018 | Ratti | B64C 39/024 |
| 10,115,277 | B2 | 10/2018 | Branscomb | |
| 10,328,769 | B2 * | 6/2019 | Ferguson | G05D 1/0276 |
| 10,372,122 | B2 | 8/2019 | Zach | |
| 10,552,215 | B1 * | 2/2020 | Xu | G06F 9/526 |
| 10,796,340 | B2 * | 10/2020 | Ta | G06Q 30/0266 |
| 2002/0009978 | A1 * | 1/2002 | Dukach | G08G 1/01<br>455/99 |
| 2011/0131235 | A1 * | 6/2011 | Petrou | G06F 16/532<br>707/769 |
| 2012/0245966 | A1 * | 9/2012 | Volz | G06Q 10/02<br>705/5 |
| 2013/0307706 | A1 * | 11/2013 | Kriezman | B60Q 1/503<br>340/988 |
| 2014/0214319 | A1 * | 7/2014 | Vucetic | G01C 21/3446<br>701/533 |
| 2014/0257692 | A1 | 9/2014 | Stefani et al. | |
| 2015/0123818 | A1 * | 5/2015 | Sellschopp | G08G 1/096816<br>340/932.2 |
| 2015/0254721 | A1 * | 9/2015 | Rad | G06Q 30/0266<br>705/14.63 |
| 2015/0279210 | A1 * | 10/2015 | Zafiroglu | G08G 1/065<br>340/932.2 |
| 2016/0116293 | A1 * | 4/2016 | Grover | G01C 21/34<br>701/23 |
| 2016/0293018 | A1 * | 10/2016 | Kim | G05D 1/104 |
| 2017/0025021 | A1 * | 1/2017 | Song | G08G 5/0013 |
| 2017/0069214 | A1 * | 3/2017 | Dupray | G08G 5/0013 |
| 2017/0240279 | A1 | 8/2017 | Molnar et al. | |
| 2017/0309170 | A1 * | 10/2017 | Wang | G08G 1/146 |
| 2017/0318325 | A1 | 11/2017 | Ortiz et al. | |
| 2018/0047319 | A1 * | 2/2018 | Barba | G03B 29/00 |
| 2018/0165998 | A1 | 6/2018 | Bogan | |
| 2018/0186309 | A1 * | 7/2018 | Batten | B60Q 1/56 |
| 2018/0186311 | A1 * | 7/2018 | Mason | B60R 21/01 |
| 2019/0050269 | A1 * | 2/2019 | Anderson | B25J 9/1617 |

FOREIGN PATENT DOCUMENTS

| | | | | | |
|---|---|---|---|---|---|
| EP | 3285246 | | | 7/2017 | |
| FR | 2578996 | A1 | * | 9/1986 | G09F 13/06 |
| GB | 2402254 | A | * | 12/2004 | G06Q 20/127 |
| JP | 2010026474 | A | * | 2/2010 | G09F 21/048 |
| JP | 2018072077 | A | * | 5/2018 | G01S 19/14 |
| JP | 2018205399 | A | * | 12/2018 | |
| KR | 200409901 | | | 3/2006 | |
| WO | WO 2007080584 | A2 | * | 1/2006 | G06F 19/00 |
| WO | WO-2007080584 | A2 | * | 7/2007 | G05D 1/0088 |
| WO | WO-2008135617 | A1 | * | 11/2008 | G08G 1/0175 |
| WO | WO 2015/131462 | | | 9/2015 | |
| WO | WO 2015/150017 | | | 10/2015 | |
| WO | WO 2015/199535 | | | 12/2015 | |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*

Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*

Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*

Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*

Technoframe. LED Bus Screens. (Nov. 18, 2011). Retrieved online Aug. 13, 2020. https://technoframe.com/led-bus-screens (Year: 2011).*

IEEE—The Bridge Magazine (2017), hereinafter IEEE. Retrieved online Nov. 9, 2020 .http://hkn.ieee.org/wp-content/uploads/2019/02/Bridge_UAVS_2017.pdf (Year: 2017).*

AerialWayz Holdings, Inc. Flying Pixels Show Going Beyond Fireworks. (Dec. 12, 2018). Retrieved online Nov. 9, 2020. https://www.droneshowacademy.com/droneshowsoftware (Year: 2018).*

* cited by examiner

AERIAL BILLBOARD

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to airborne position monitoring networks and aerial billboards, more particularly, to a system and method for location-targeting the delivery of media from an aircraft.

2. Description of the Related Art

A large segment of the population is connected to the Internet for a considerable portion of the day. Many people, whether for business or social reasons, believe that they must be connected 100% of the time. Perhaps the most common mechanism people use for connecting to the Internet is through a smartphone or properly enabled cell phone. To reduce cell usage, and thus save money, Wireless Local Area Networks (WLANs), such as IEEE 802.11 (WiFi), or Wireless Personal Area Networks (WPANs), such as Bluetooth, are often used to connect a smartphone to the Internet. WLAN and WPAN networks have a limited range. Thus, connections to the Internet through a LAN are relatively easy when the user is located near a known access point, such as at home or at work. When away from known access points, LAN connections become more difficult. This problem is alleviated through the use of publically available access points, such as might be found in a coffee shop or restaurant. However, publically accessible access points do not provide blanket coverage in all geographic regions. Further, not all access points are publically accessible.

Application Ser. No. 16/601,362, entitled SYSTEM AND METHOD FOR TARGETING THE DISTRIBUTION OF MEDIA FROM A MOBILE PLATFORM, invented by Peter Ta et al., and filed on Oct. 14, 2019, describes an automotive targeted parking system that may include a WiFi access point (hotspot). However, automobiles are not able to park in all locations in which a WiFi hotspot may be of use.

Drone aircraft are capable of a broader range of coverage than an automobile, and their flight paths can be controlled from remote locations. Drones have been used to present 2-dimensional, 3-dimensional, and persistent illusion images using light emitting diodes (LEDs) and liquid crystal displays (LCDs). However, to date, there appears to be effort to use a drone to act as a publically accessible WLAN access point. Neither has there been an effort made to team groups of drones together to create a combined image in the form of a billboard.

It would be advantageous if a drone aircraft could be enabled to act as a publically accessible WLAN access point.

It would be advantageous if the WLAN drone could be directed to targeted stationary locations.

It would also be advantageous if the WLAN enabled drone could be equipped with a media projection subsystem to display advertising and community service messages. It would also be advantageous if the media presentation subsystem could be selectively enabled. It would be advantageous if groups of drone media projection subsystems could be combined together to create combined image or aerial billboard.

It would be advantageous if a Domain Name System (DNS) service associated with the drone could track the Uniform Resource Locator (URL) addresses requested through publically accessible WLAN.

It would be advantageous if the time and location of WLAN services could be tracked, recorded, and continuously verified.

SUMMARY OF THE INVENTION

A system and method are disclosed herein for aircraft positioning, with emphasis on the ability to provide a Wireless Local Area Network (WLAN) IEEE 802.11 (WiFi) access point, media projection subsystem, or both. Thus, the system may act as a mobile advertising platform that seeks to expand and capture market share within the outdoor advertising market segment by directing the selective deployment of media to preferred target locations. Once in a selected flight path, the media message can be activated remotely by electrical signaling (such as Bluetooth, cellular, or WiFi). The system may transmit the following information: (i) a unique identifier for the device in use (for example, radio-frequency identification), (ii) the time, date, duration, and location (using global positioning satellite (GPS) or cellular triangulation systems), (iii) an indication that the media projection subsystem has been deployed, and (iv) an indication that the WLAN access point is in use. Further, if the WLAN access point is in use, the system relays Uniform Resource Locator (URL) address requests from proximate users, and returns the request results. Graphic information system (GIS) mapping technology may be used to compensate a person or business entity associated with the aircraft system for operating in specified locations.

Accordingly, an aircraft media system is provided. The aircraft includes a deployment subsystem having an interface to supply an enablement signal with an identification code, in response to an aircraft maintaining a selected midair position in the atmosphere above the ground. The midair position may be a stationary position or a moving flight path. A location subsystem determines the midair geographic location of the aircraft, and a communications subsystem, typically a cellular link, has an interface to receive verification information including the enablement signal, identification code, and geographic location, and an interface to transmit the verification information to a server or to a local memory for subsequent downloading. In one aspect, the system may include a WLAN (e.g., WiFi) access point or hotspot that is available for use by the public at large.

A targeting software application, stored in a memory of either a server or the aircraft, enables a sequence of processor executable instructions permitting the selection of the midair position from a plurality of potential midair positions. Each potential midair position may have a corresponding weighted value. For example, if the identification code (i.e., the aircraft) is associated with a first entity, the first entity may receive a reward corresponding to the value of the selected midair position.

In another aspect, the system may include a media projection subsystem, which may be selectively enabled, having an interface to project media. The media may be a visual image, broadcast sound, or both. The deployment system may supply the enablement signal in response to the media projection subsystem being enabled, with the first entity receiving no reward if the media projection subsystem is not enabled. In one variation, the communications subsystem receives media uploads from the server, and the communications subsystem provides the media uploads to the media projection subsystem. In another variation, the aircraft rotates the media projection subsystem around a vertical z axis in a selected midair stationary position.

In one aspect, the aircraft includes a camera having an output to supply images of a proximate geographic location, which are relayed to the server through the communications subsystem. In one variation, a facial recognition software application, stored in a non-transitory memory of the server, enables a sequence of processor executable instructions for comparing the received camera images to facial data. The facial recognition application cross-references recognized facial data to associated publically available social network data. In another variation, media can be selected in response to the social network data and transmitted to the aircraft communications subsystem so that it can be provided to the media projection subsystem.

If equipped with a publically accessible WLAN hotspot (access point), the hotspot accepts URL address requests from a user device and transmits the URL address requests, via the communications subsystem, to a DNS service. If also equipped with a media projection subsystem, the server may include a media searcher application for accessing media associated with URL addresses, and transmitting the accessed media to the aircraft communication subsystem. The communications subsystem receives the accessed media from the server and provides them to the media projection subsystem. Alternatively, the media may be communicated directly to the user device via the WLAN link. As above, a targeting software application may permit the selection of weighted value the midair position from a plurality of potential midair positions. Alternatively, it the WLAN hotspot receives URL address requests from a first user device, the aircraft may change midair location so as remain in WiFi communication with the first user device.

An aerial billboard system is also presented that includes a pod of aircraft. Each aircraft in the pod includes a media projection subsystem having an interface to project a visual display. A deployment subsystem has an interface to supply an enablement signal with an identification code, in response to an aircraft maintaining a unique midair position and the media projection subsystem being enabled. A location subsystem determines the midair geographic location of each aircraft. A communications subsystem has an interface to receive verification information including the enablement signal, identification code, and geographic location, and an interface to transmit the verification information to a server. The plurality of aircraft forms a position matrix with each aircraft midair position assigned with respect to adjacent aircraft midair positions, so that the combined plurality of aircraft visual displays form a summed display matrix image billboard. Each aircraft maintains one of the following: a midair position that is stationary, varying with respect to adjacent aircraft midair positions, as a component of a group flight path where aircraft maintain constant midair positions with respect to adjacent aircraft, or as a component of a group flight path with midair positions that vary with respect to adjacent aircraft. A targeting software application may be used to permit the selection of the location of the position matrix from a plurality of potential weighted value position matrix locations, where an entity associated with the aircraft receives a reward corresponding to the value of the selected position matrix location.

Additional details of the above-described systems and associated methods of implementation are provided below.

DETAILED DESCRIPTION

Figure 1A:
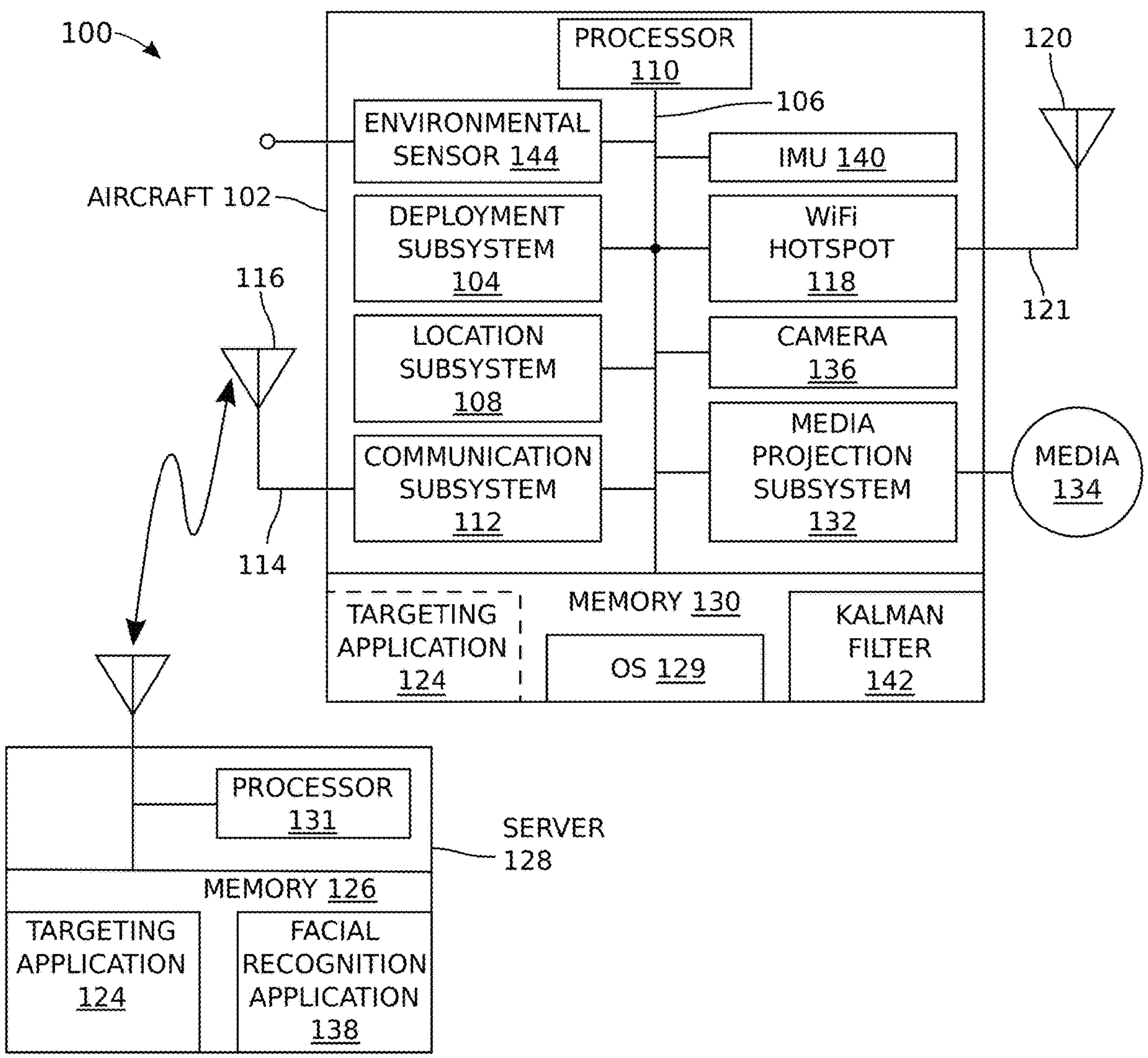
FIGS. 1A and 1B are schematic block diagrams of an aircraft media system.
Figure 1B:
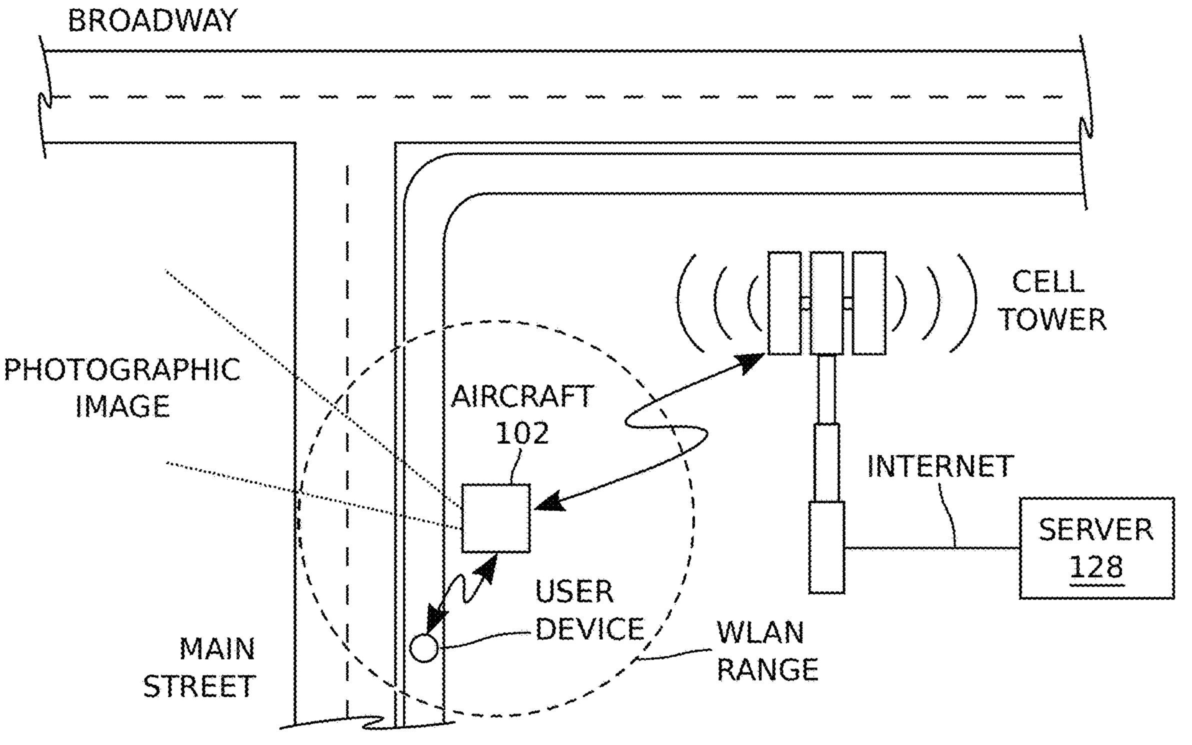

FIGS. 1A and 1B are schematic block diagrams of an aircraft media system. The system 100 comprises an aircraft 102, which may be a micro air (aerial) vehicle (MAV) or miniature unmanned aerial vehicle (UAV), more colloquially known as a drone, or even an manned aircraft or helicopter. The system 100 is not limited to any particular type of aircraft. A deployment subsystem 104 has an interface on line 106 to supply an enablement signal with an identification code, in response to an aircraft 102 maintaining a selected midair position in the atmosphere above the ground. A location subsystem 108 determines the midair geographic location of the aircraft 102, which is provided on line 106. Examples of a location subsystem 108 include a Global Positioning Satellite (GPS) system receiver, assisted GPS taking advantage of cell tower data, a Wireless Local Area Network IEEE 802.11 (WiFi) positioning system, cell-site multilateration, inertial system, or a hybrid positioning system. Hybrid positioning systems find location using several different positioning technologies, such as GPS, combined with cell tower signals, wireless internet signals, Bluetooth sensors, IP addresses, and network environment data. Cell tower signals have the advantage of being less hindered by buildings or bad weather, but they usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. In one aspect, the aircraft can be equipped with an Inertial Measurement Unit (IMU), such as an accelerometer or gyroscope, to detect changes in location, used to increase the accuracy of other location methods.

A communications subsystem 112 has an interface to receive verification information including the enablement signal, identification code, and geographic location on line 106. The communication subsystem 112 has an interface on line 114, connected to antenna 116, to transmit the verification information to a server. In some aspects, the identification code can be extrapolated from an address associated with the communications subsystem 112, the location subsystem 108, or the aircraft 102. Otherwise, the identification code is a code loaded into memory 130, or alternatively it can be a mechanical device, such as a DIP switch. The most typical examples of a communication subsystem are cellular systems (e.g., Global System for Mobile Communications (GSM), Universal Mobile Telecommunications System (UMTS)-time division duplexing (TDD), Long-Term Evolution (LTE), $4^{th}$ Generation, or $5^{th}$ Generation), and the like. Less typically, the communications subsystem may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). As another alternative, the communication messages may be stored in the aircraft memory 130 and periodically downloaded using a wireless or hardwire connection. The system 100 is not limited to any particular type of communication subsystem.

Regardless of the type of communications subsystem used, the aircraft 102 may further comprise a publically accessible WLAN IEEE 802.11 access point (AP) 118, commonly known as a WiFi hotspot. WiFi is the most likely choice since most user smartphone or personal communication devices are typically WiFi equipped. Alternatively, but less common, the access point 118 may be a Wireless Personal Area Network (WPAN) IEEE 802.15, examples of which include Li-Fi, wireless USB, and Bluetooth. Even more unlikely as an access point are Long Range Wireless systems. In the case of the WiFi hotspot being the communications subsystem, items 112 and 118 would be collocated. otherwise, the WiFi hotspot 118 is connected to the communications subsystem 112 through line 106 and is also connected to antenna 120 on line 122.

The system 100 may further comprise a targeting software application 124 stored in a non-transitory memory, enabling a sequence of processor executable instructions permitting the selection the midair position from a plurality of potential midair positions. The non-transitory memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the systems described herein may include both a volatile memory unit and a non-volatile storage device. The memory may be implemented as shared memory and/or distributed memory in a network device. As shown, the targeting application 124 is embedded in the memory 126 of server 128, or in a network of servers (not shown). Alternatively, as shown in phantom, the targeting application 124 may be embedded in the memory 130 of the aircraft.

In one aspect, each potential midair position has a corresponding weighted value. In another aspect, the identification code or aircraft is associated with a first entity, and the first entity receives a reward corresponding to the value of the selected midair position. The midair position may be either a stationary position or a moving flight path. The term "stationary" as used herein is relative, as the ability of an aircraft to hover without moving is dependent upon the type of aircraft and weather conditions. In the case of fixed wing aircraft, hovering in a stationary position may entail flying in a pattern (e.g., circular or figure-8) around a fixed location.

As used herein, an "entity" may be a person, a business, a corporation, or any type of social or business unit able to claim ownership of, or association with, the identification code, aircraft 102, system 100, server 128, or server clients (discussed below).

The most obvious type of reward is money. However, the first entity may alternatively be rewarded with bitcoin, cryptocurrency, coupons, or services. In one aspect, the target location is selected from a plurality of weighted (in value of importance) target locations, in response to the specific geographic location of where the media projection subsystem or WiFi hotspot is enabled. For example, the target location may be weighted in response to geographic location factors such as proximate vehicular traffic, line of sight from a particular vantage point, proximate pedestrian traffic, proximity to cultural events, proximity to cultural facilities, and combinations thereof. A cultural event is generally understood to be an activity involving human beings. Likewise, a cultural facility is a facility used by human beings, such as a museum, office building, or grocery store parking lot. As a more explicit example, a target location may have a first value if the media projection subsystem 132 is enabled within X feet of a particular location, and second value, greater than the first value, if the media projection subsystem is enabled within X/2 feet of the same location. Other factors reflected in the weighting of the target locations may include the type of media being projected, the time of day, the day of the week, the date, the length of time the media is being projected, and combinations thereof. There may be locations, such as parks, hospitals, or freeways where signage is legally restricted, and in one aspect these locations are given a target value of zero. In one aspect, the system may even prevent the enablement of the media projection subsystem in legally restricted areas. The system 100 described herein is not limited to any particular factors weighting a target location. The system may be interactive in the sense that the first entity may select a deployment location after determining the value of a location. In this sense, the targeting application does not so much direct the media presentation subsystem to a particular predetermined location, as suggest multiple possible locations. Although the target locations and weights may be predetermined, in some aspects the weighting for non-predetermined areas may be calculated concurrently with the deployment of the media projection subsystem. That is, the target locations and the target location weights need not necessarily be predetermined.

As is common in many computer systems, a processor 110 is connected to the bus line 106, to pull operating instructions from operating system (OS) 129 in memory 130, and manage communications between the various components of system 100. Likewise, server 128 would be enabled through the use of processor 131. For ease of understanding, the above-described functions have been described as individual components. However, it should be understood that in practice, multiple functions may be performed by a single device or subsystem.

Figure 2:
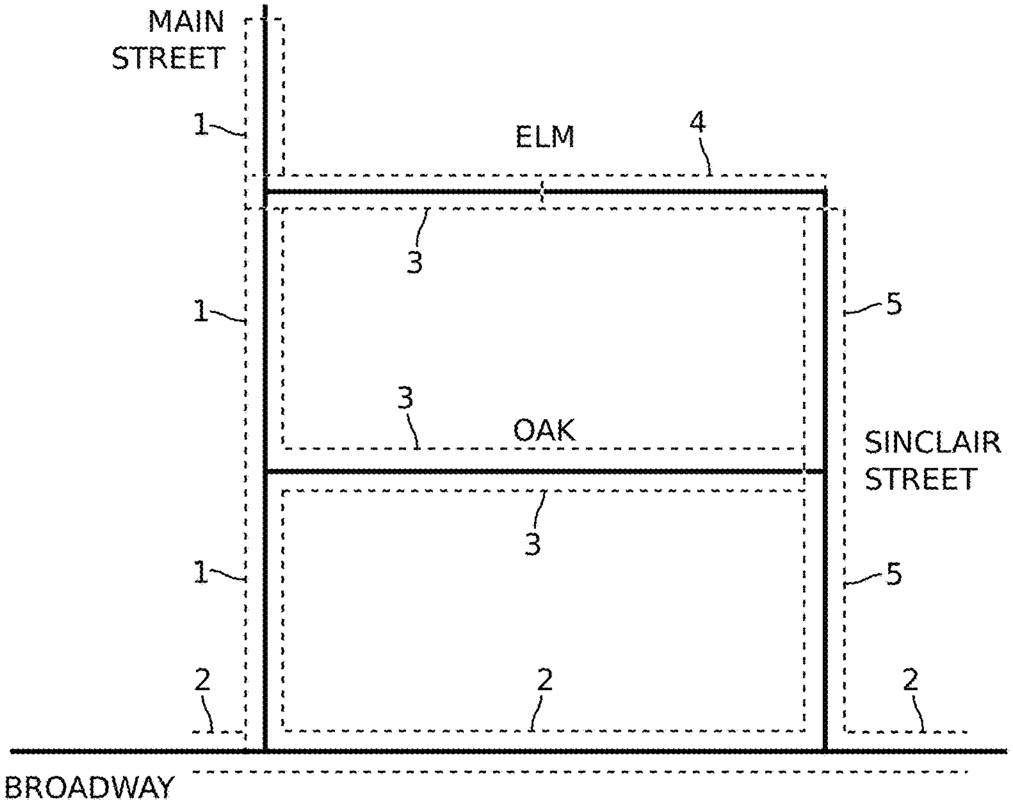
FIG. 2 is a plan view of a geographic regions cross-referenced to the weighted value of various midair positions.

FIG. 2 is a plan view of a geographic regions cross-referenced to the weighted value of various midair positions. As shown, the regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5.

Returning to FIG. 1A, the system 100 may optionally further comprises a media projection subsystem 132 attached to the aircraft 102, having an interface 134 to project media, as well as an interface on line 106. In one aspect, the media projection subsystem 132 is selectively enabled. Some examples of the media interface 134 include an electrically passive screen (flexible or rigid), a lighted screen, a field of light emitting diodes (LEDs), or a holographic display. In other words, the media interface may be a 2-dimensional or 3-dimensional image, which may or may not change. The media interface 134 may also broadcast sounds as an alternative, or in addition, to the displayed image. In the case of a stationary position, the aircraft may rotate the media projection subsystem around a vertical z axis in a selected midair stationary position. In one variation, the deployment system 104 may supply the enablement signal in response to the media projection subsystem 132 being enabled, with the first entity receiving no reward if the media projection subsystem is not being enabled.

In one aspect, the communications subsystem 112 receives media uploads from the server 128, and the communications subsystem provides the media uploads to the media projection subsystem 132 for presentation. In another aspect, the aircraft 102 further comprises a camera 136 having an output on line 106 to supply images of a proximate geographic location to the aircraft 102. The communications subsystem 112 transmits these images to the server 128 or the images are stored them in local memory 130. In one variation, a facial recognition software application 138, a form of Biometric Artificial Intelligence, is stored in the non-transitory memory 126 of the server 128, enabling a sequence of processor executable instructions for comparing the received camera images to facial data. The facial recognition application cross-references recognized facial data to associated publically available social network data. DeepFace is an example of one such facial recognition system. Optionally, the facial recognition software application 138 may include components that select media in response to the social network data and transmit the media to the aircraft communications subsystem 112. The communications subsystem 112 receives the media uploads from the server 128, and provides the media uploads to the media projection subsystem 132 for presentation. For example, the media may be images associated with a user's Facebook entries or contacts.

The camera images may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. Alternatively or in addition, the camera images may act to verify that the media projection subsystem 132 has been enabled. In one aspect, simply recording a change in images, and thus proximate traffic, can be used as a means for proving media projection subsystem enablement.

In one aspect, as described in more detail in the explanation of FIGS. 5A through 5J, the system 100 further comprises an aircraft pod including a plurality of aircraft, with each aircraft supplying an enablement signal in response to maintaining a unique midair position. As such, the pod of aircraft forms a position matrix with each aircraft midair position assigned with respect to adjacent aircraft midair positions. The end result is that the combined pod of aircraft visual displays form a summed display matrix image billboard. In one aspect, the aircraft 102 may include an Inertia Measurements Unit (IMU) 140. The IMU 140 may take the form of accelerometers aligned in 3 orthogonal axes, gyroscopes, magnetometers, or a combination of these devices. Inertial Measurement Units, also called inertial motion units, are devices that facilitate continuous computation of the orientation of the objects to which they are attached. IMUs typically have multiple single- or multi-axis sensors, such as gyroscopes, accelerometers, and magnetometers. Ideally, the accelerometer and magnetometer respectively measure the field strength of the local gravitational and magnetic fields produced by a reference object, such as Earth, and in turn produce sensor field strength readings. The gyroscope measures the rotational speed of the sensor relative to itself, producing a sensor rotational speed reading. The sensor field strength and rotational speed readings may be used singularly or in combination to compute the orientation of the IMU and its associated objects relative to the reference object (aircraft). Further, the aircraft 102 may include a Kalman filter 142 embedded in the memory 130, enabling a sequence of processor instructions for estimating variables, such as wind and other weather-related occurrences whose effects impact precisely locating the aircraft.

In another aspect, the aircraft 102 may further comprise an environmental sensor 144, such as might be used to measure wind, pressure, and temperature variables. Again, the environment data collected can be used, with or without the IMU data and the Kalman filter, to aid in more precisely locating the aircraft.

Figure 3:
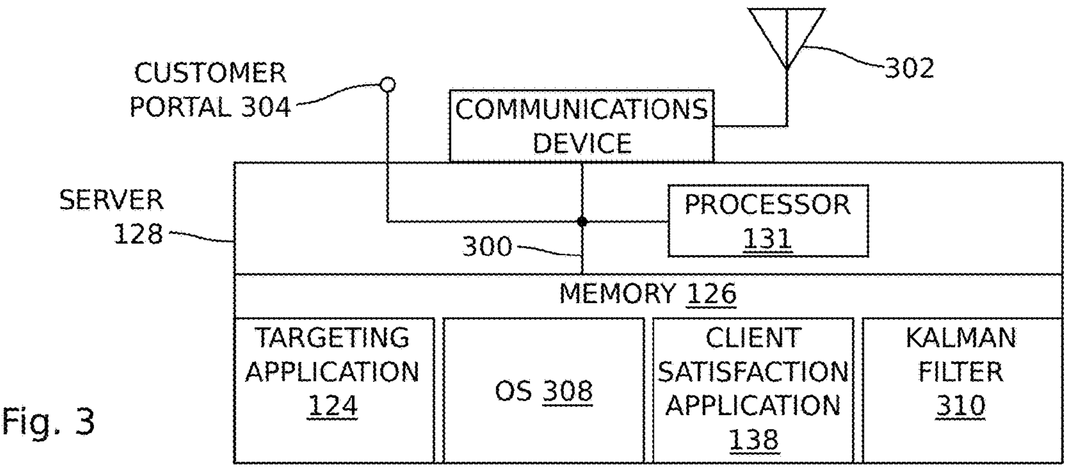
FIG. 3 is a schematic block diagram of the server.

FIG. 3 is a schematic block diagram of the server. For convenience, all the components associated with server 128 are shown embedded as a single block, but it should be understood that these components are not necessarily embedded in a single hardware unit, and are not necessarily in communication with each other. As shown, the server 128 comprises a first interface on line 300, connected to antenna 302 through communications device 310, to receive the verification information from the aircraft communication subsystem 112. A second interface on line 304, also referred to as a customer portal, receives first client goals such target market, deployment hours, deployment rate, and midair positions to name a few examples. Otherwise, a client satisfaction software application 306, embedded in memory 126, includes processor instructions for determining the above-mentioned client goals. For example, the client satisfaction software application 306 may determine midair positions meeting the first client goals in response to factors such as location, local demographics, traffic, population density, length of deployment, and combinations thereof. An operating system 308 works in cooperation with the processor 131 to enable software applications in memory 126 and to process information to and from communications device 310.

In one example aircraft 102 comprises a selectively enabled media projection subsystem 132 and the server 128 is associated with a second entity (see FIG. 1A). Then, a server client provides a reward to the second entity when the media projection subsystem 132 is enabled, but provides no reward to the second entity when the media projection subsystem is not enabled. Similarly, rewards to the first or second entities may be based upon the volume of traffic through the WiFi hotspot 118.

In one aspect, the server 128 further includes a Kalman filter 310 to aid in precisely locating the aircraft. The Kalman filter 310, if necessary, may be embedded with the server 128, as opposed to aircraft, in an effort to minimize aircraft processor functions. However, this variation would require that the Kalman filter 310 receive IMU data and/or environmental data, such a wind speed and direction, from the aircraft itself or from proximate ground stations.

Figure 4:
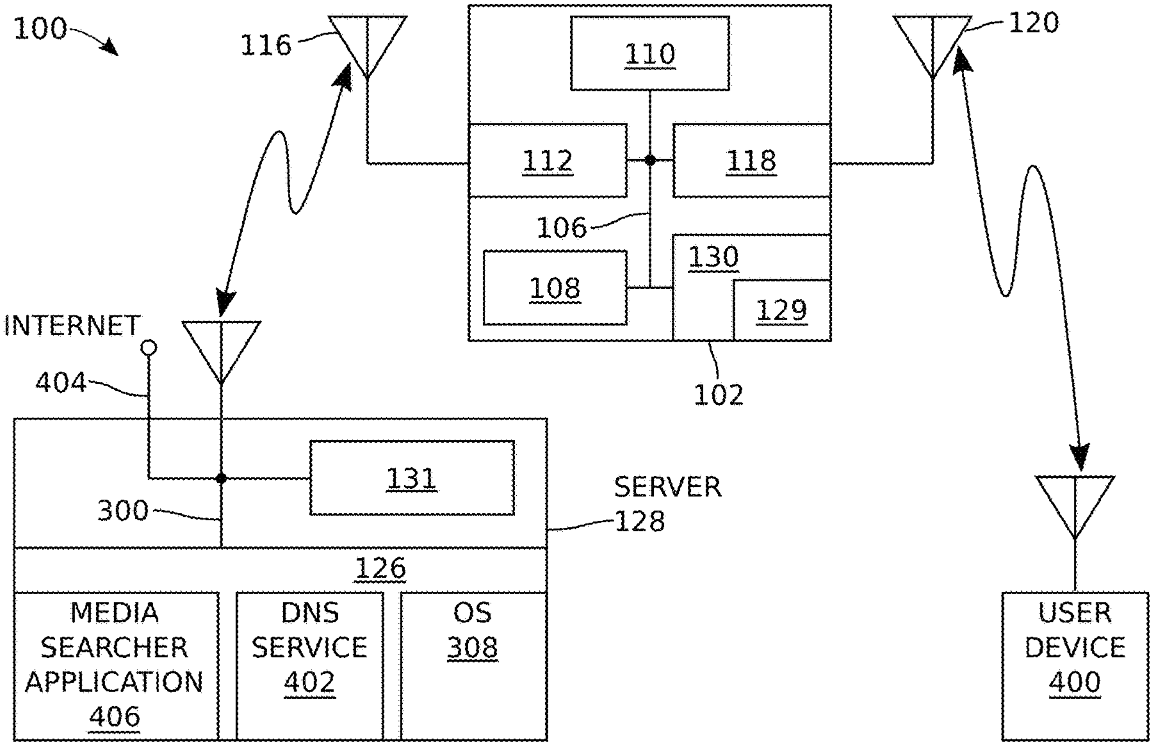
FIG. 4 is a schematic block diagram of an aerial communication system providing publically accessible Internet service.

FIG. 4 is a schematic block diagram of an aerial communication system providing publically accessible Internet service. As in FIG. 1A, the system 400 is associated with aircraft 102, which in turn, comprises a location subsystem 108 to determine the midair geographic location of the aircraft. A communications subsystem 112 has an interface on line 106 to receive verification information including the geographic location, and an interface to transmit the verification information to a server 128 via antenna 116. A WLAN IEEE 802.11 (WiFi) hotspot 118 accepts Uniform Resource Locator (URL) address requests from a user device 400 (e.g., a smartphone) via antenna 120, and transmits the URL address requests, via the communications subsystem 112, to a Domain Name System (DNS) service 402 embedded with the server 128. The DNS service 402 makes Internet Protocol (IP) address searches, if necessary, via the Internet interface on line 404. A listing of IP addresses can be stored in memory, which may be of value to server clients. In some aspects the IP addresses can be cross-referenced to user device identification information.

Optionally, the aircraft 102 may comprise a media projection subsystem 132, as explained above. In this case, the server 128 may further comprise a media searcher application 406, stored in a non-transitory memory 126, and enabled as a sequence of processor instructions for accessing media associated with URL addresses, and transmitting the accessed media to the aircraft communication subsystem 112. The communications subsystem 112 receives the accessed media from the server 128 supplies the accessed media to the media projection subsystem 132 for presentation. In one aspect, the media projection subsystem 132 is selectively enabled. The media projection subsystem enablement may be triggered locally before the aircraft is deployed, or remotely after the aircraft arrives at the desired midair position, for example, via instructions sent from the server 128, or using an independent remote control device.

Alternatively, if there is no media projection subsystem 132, or if the media projection subsystem is not enabled, the communications subsystem 112 may receive the above-described accessed media from the server 128, and provide the accessed media to the WiFi hotspot 118, which in turn provides the accessed media to the user device 400.

In one variation, the WiFi hotspot receives a URL address request from user device 400 and the aircraft 102 changes midair position so as remain in WiFi communication with the user device. The aircraft may continually keep pace with the user device or return to its original midair position after moving a predetermined distance from its original position, or after losing contact with the user device. Alternatively, the aircraft may select a new midair position after moving a predetermined distance from the its original position, or after losing contact with the user device. In another variation, as described in the explanation of FIG. 1A, the system further comprises a targeting software application (124, see FIG. 1A) that permits the selection of the midair position from a plurality of potential midair positions. Each potential midair position may have a corresponding weighted value, and an entity associated with the aircraft or system may receive a reward corresponding to the value of the selected midair position. The midair position may be a stationary position or a flight path.

FIGS. 5A through 5J depict aspects of an aerial billboard system. The system 500 comprises a pod of aircraft 502 comprising a plurality of aircraft 102. Returning briefly the FIG. 1A, and as explained in greater detail above, each aircraft 102 in this system 500 comprises a media projection subsystem 132, and a location subsystem 108 that determines the midair geographic location of the aircraft. In one aspect, the aircraft positions and the media projection subsystem deployment are assumed to occur correctly, or perhaps verification is performed using camera images from an aircraft or from the ground. Otherwise, a deployment subsystem 104 has an interface to supply an enablement signal with an identification code, in response to an aircraft maintaining a unique midair position and the media projection subsystem being enabled. A communications subsystem 112 has an interface to receive verification information including the enablement signal, identification code, and geographic location, and an interface to transmit the verification information. In one aspect, the communications subsystem (e.g., cellular) transmits verification information to a server 128. Alternatively, data can be collected by a central controller aircraft using either a WLAN, cellular, or proprietary link, or data can be stored in local memory. Data can be collected in the central controller memory for subsequent downloading, and relayed to a land-based server. In another aspect, the verification information is sent to a simple handheld controller of smartphone application. Returning to FIG. 5A, the plurality of aircraft forms a position matrix with each aircraft midair position assigned with respect to adjacent aircraft midair positions. Alternatively stated, each aircraft position is unique and is assigned with respect to a fixed position in space. The combined plurality of aircraft visual displays form a summed display matrix image billboard (i.e., a billboard image). In this simple example, each individual aircraft projects an image represented by the asterisk symbol, and the overall summed display matrix image billboard depicts a smiling face. Although the figure implies that each media projection subsystem projection (asterisk) is identical, it should be understood that some or all of the aircraft may present unique image displays. The figure also implies that each image is a simple on/off pixel. However, as presented below, each image may be complex. Further, the image of FIG. 5A implies a 2-dimensional position matrix, for example, with aircraft aligned in the x and z planes. However, it should be understood that the position matrix may be 3 dimensional with aircraft aligned in the x, y, and z planes to make more complex billboard images. In addition to each aircraft projecting a consistent, non-changing image, it should also be understood that some or all of the aircraft media projection subsystems may project a changing medium, so as to present a movie or video like image. One simple example would be some or all the projected images changing color. Further, some or all of the aircraft communications subsystem may supply uploaded media to the media projection subsystem, so that the projected media can be updated on-the-fly.

Figure 5A:
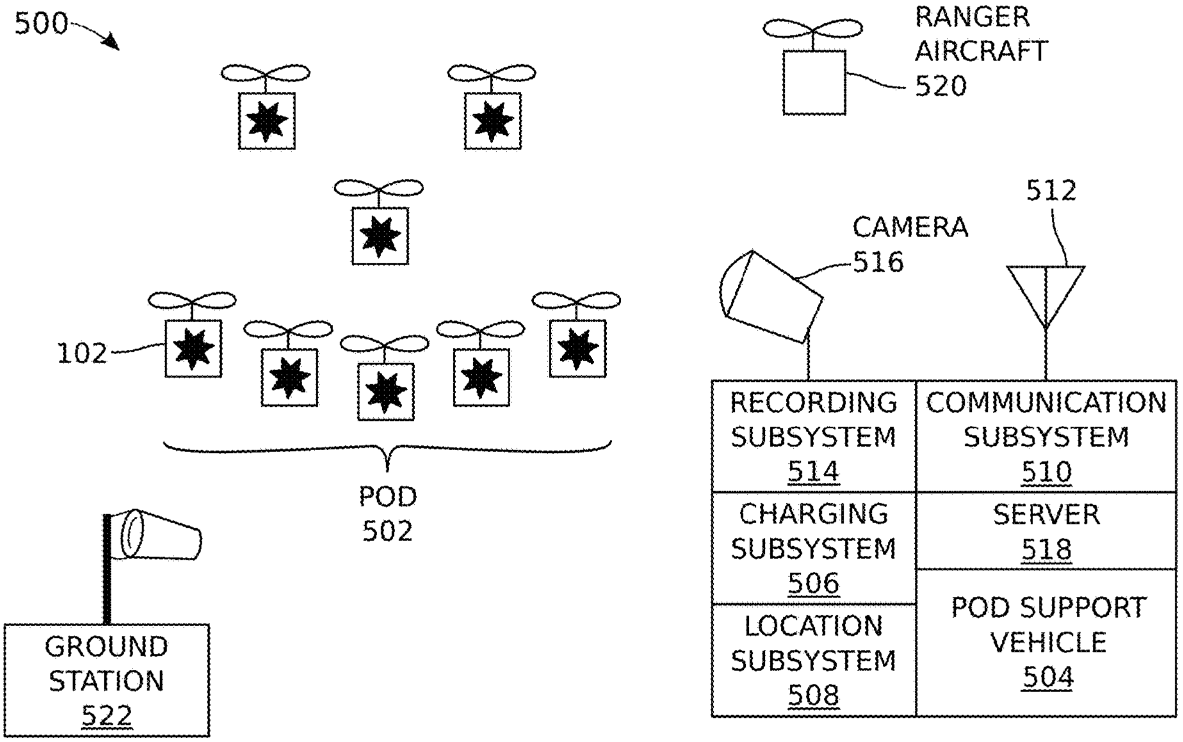
FIGS. 5A through 5J depict aspects of an aerial display system.
Figure 5B:
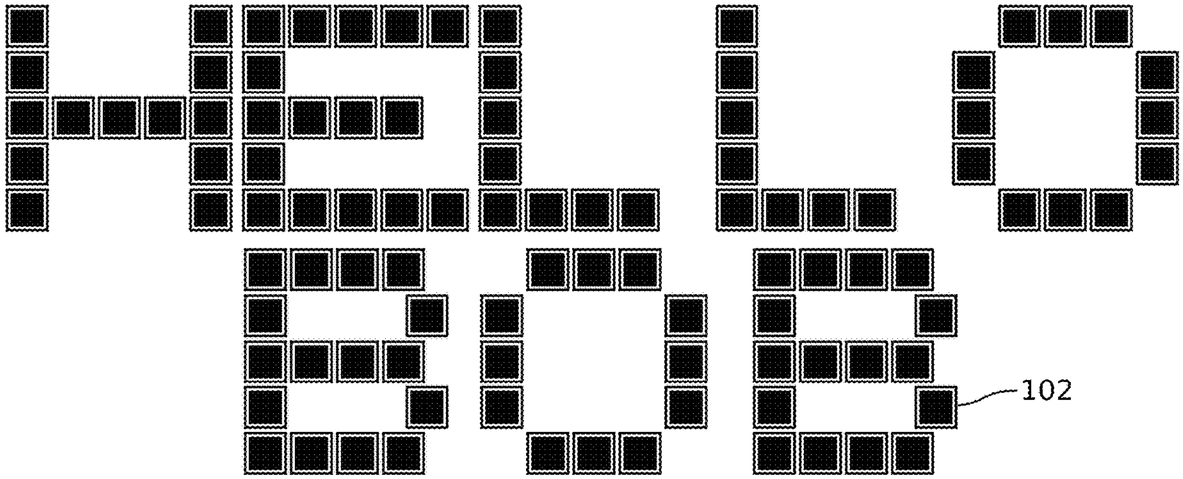

As shown in FIG. 5A, each aircraft 102 may maintain a midair stationary position. FIG. 5B depicts an image where the media projection subsystems operate as "pixels" to form a billboard. In other words, the billboard is formed by simply enabling displays, for example, each aircraft simply projecting a white color, and arranging the pixels so as the form a message.

Figure 5C:
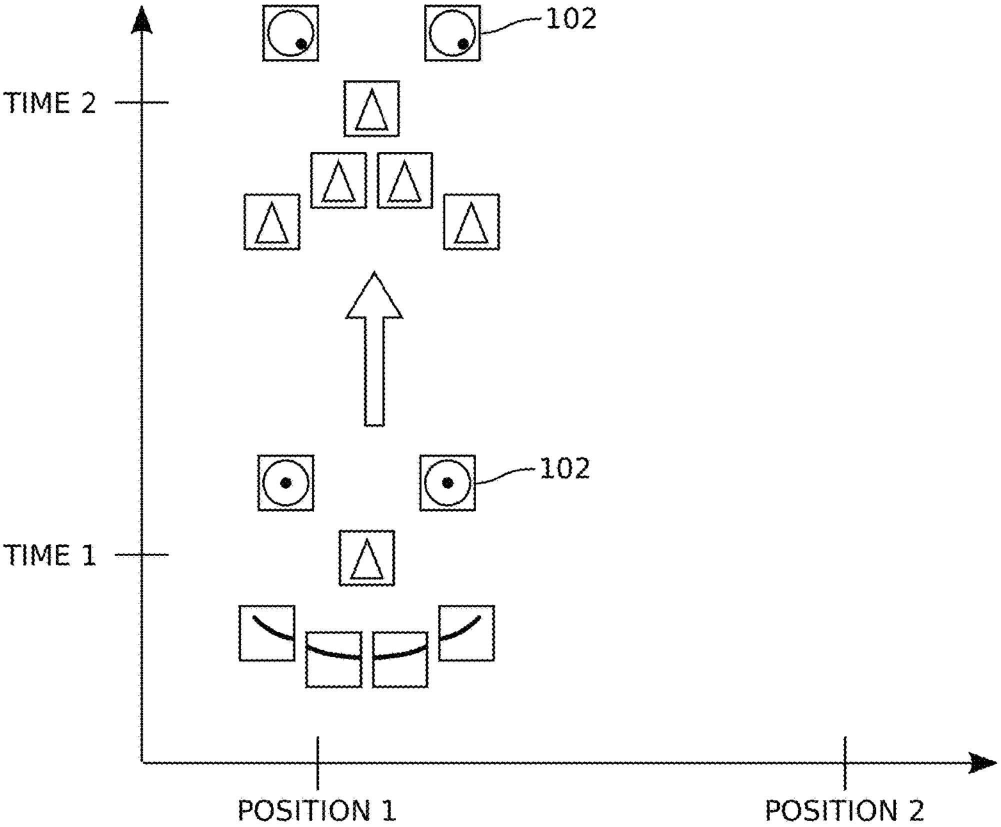

As shown in FIG. 5C, the midair position of the aircraft may stay the same (position 1), but some of the aircraft positions vary with respect to adjacent aircraft midair positions from Time 1 to Time 2. Further, some of the display images change (e.g., from portions of a lip to teeth).

Figure 5D:
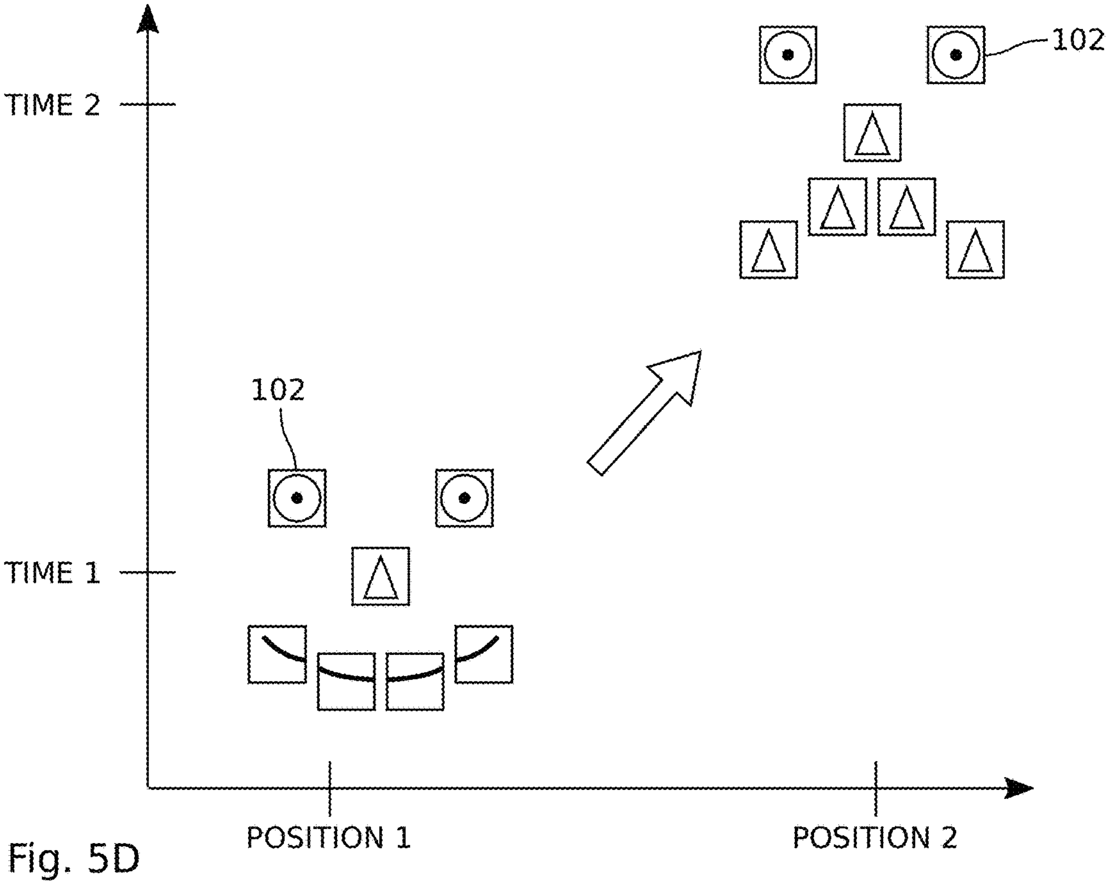
Figure 5E:
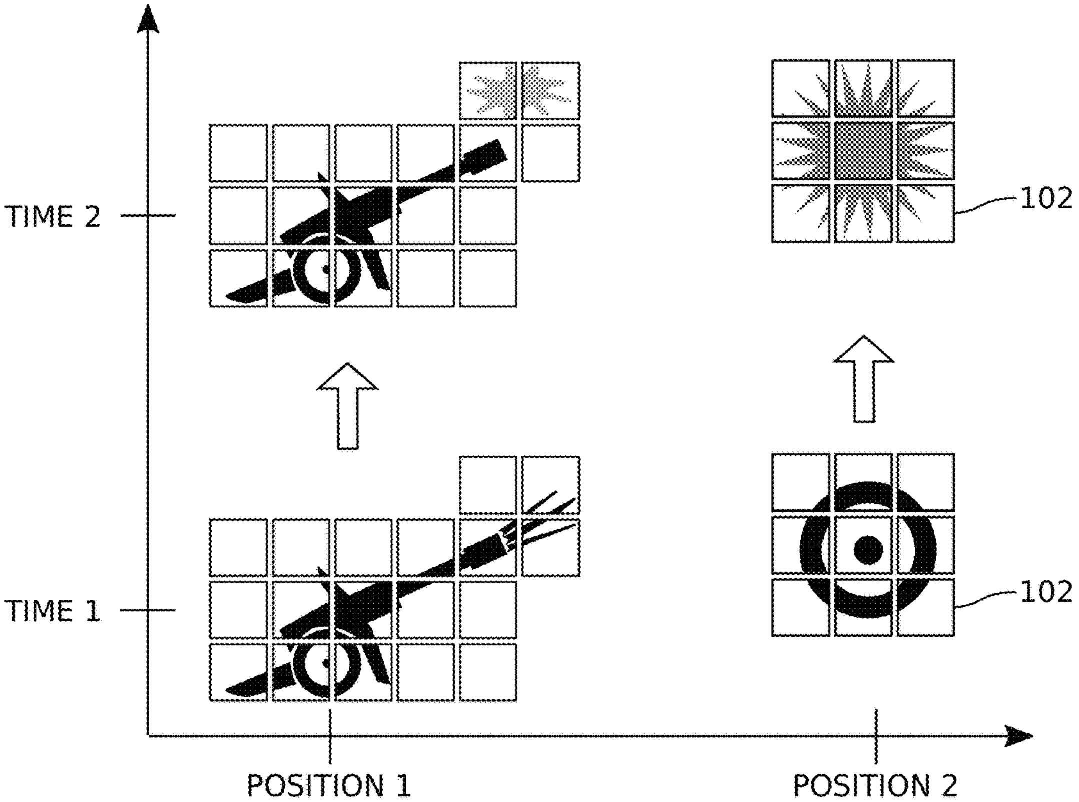

FIG. 5D depicts an example of aircraft midair positions as a component of a group flight path, moving from position 1 to position 2. Alternatively but not shown, the aircraft midair positions may be a component of a group flight path where adjacent aircraft maintain constant midair positions with respect to adjacent aircraft. FIG. 5E depicts two related position matrices where the aircraft maintain constant midair positions with respect to each other, but the media display changes from Time 1 to Time 2.

Figure 5F:
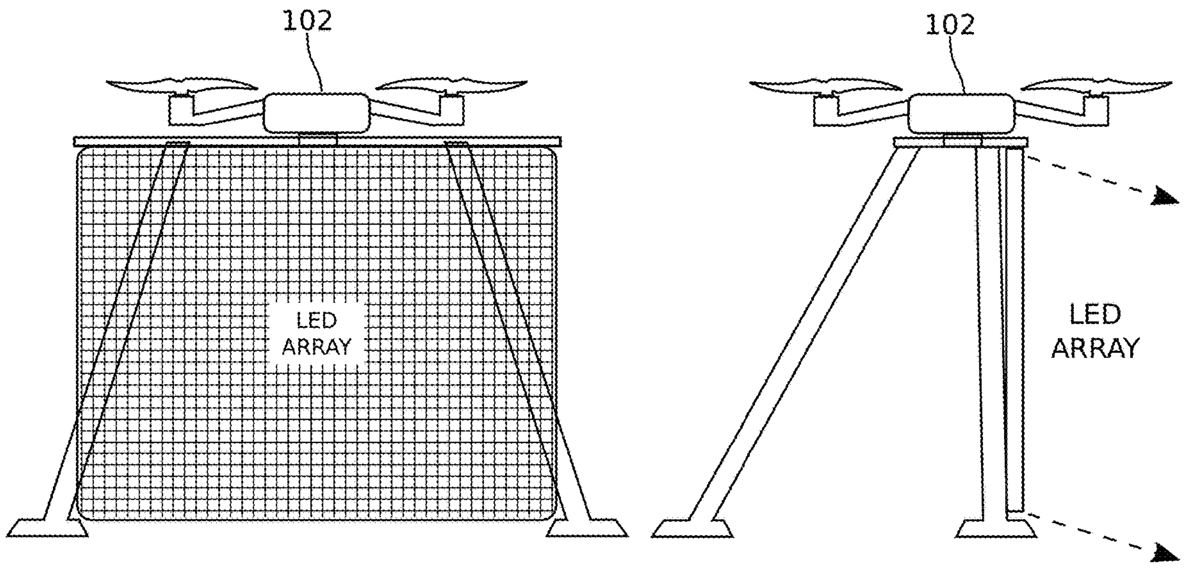
Figure 5G:
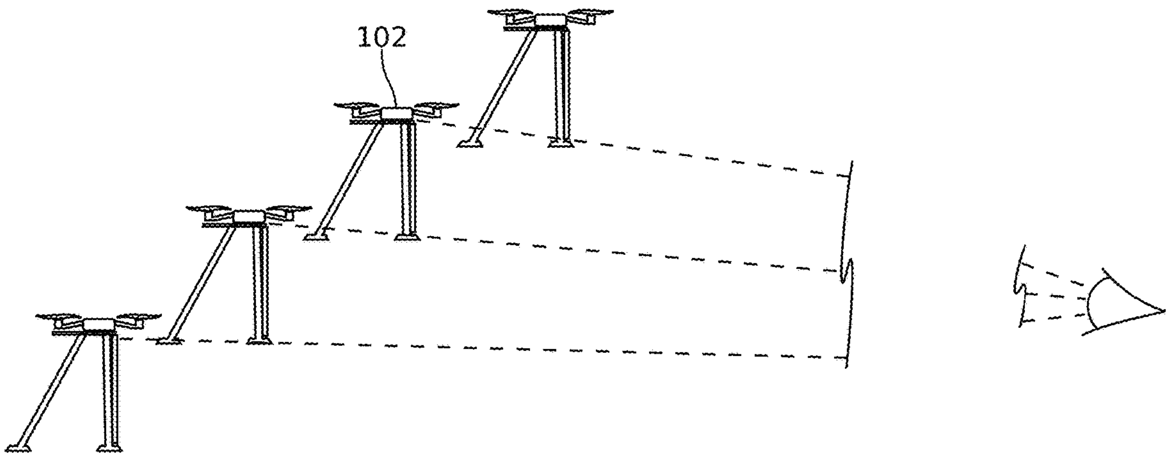

FIG. 5F depicts an exemplary drone aircraft with an LED array display screen enabling the media projection subsystem. The LED is directional, facing one particular side of the drone. However, omni-directional, circular surrounding, and persistent image fan displays are also known. FIG. 5G shows that the LED array can be tilted for viewing angle.

Figure 5H:
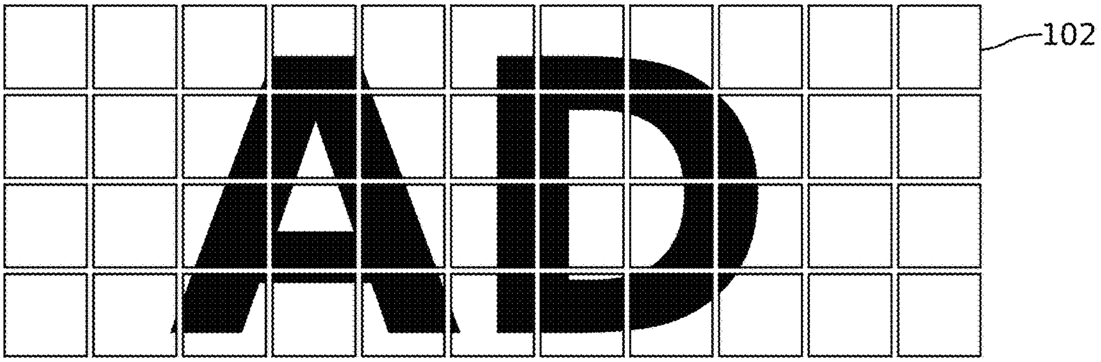
Figure 5I:
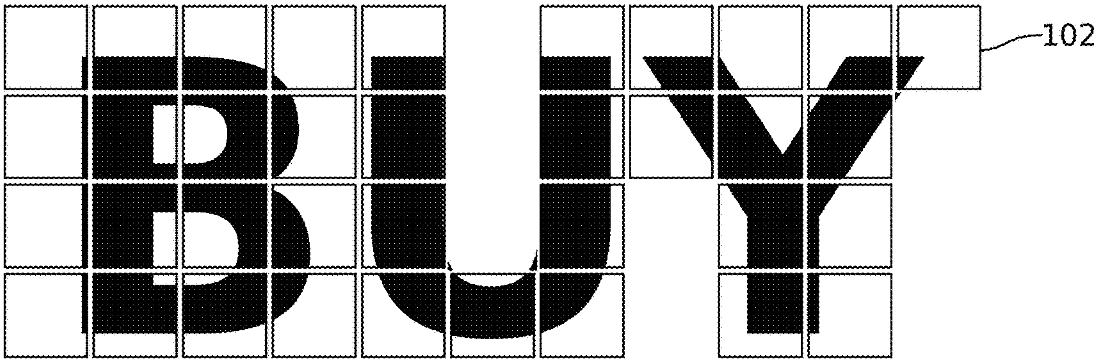
Figure 5J:
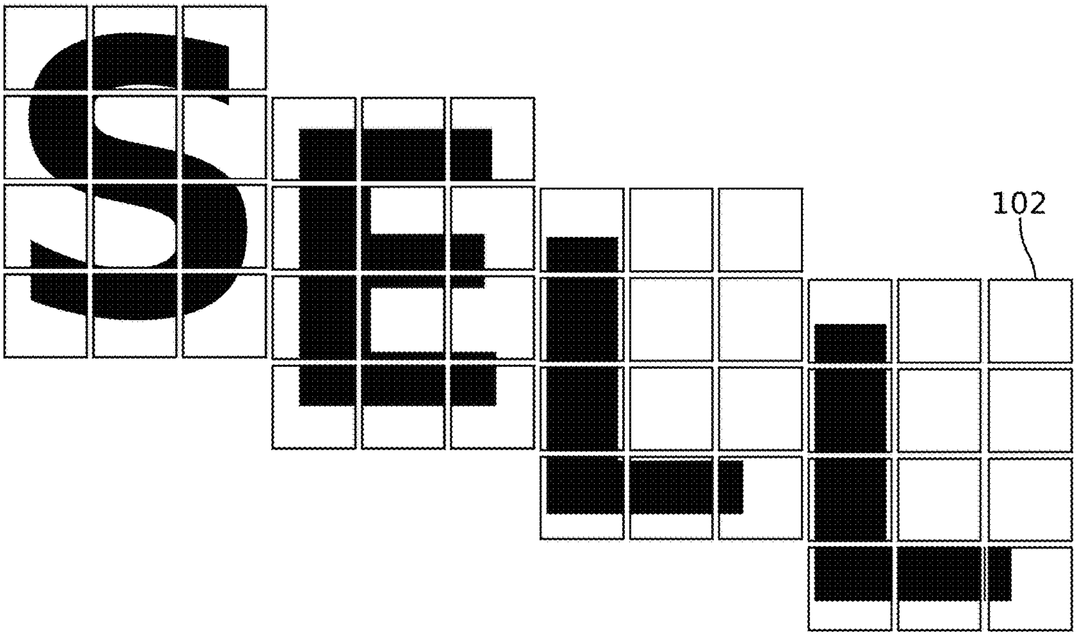

The billboard system can also be used in a manner similar to a JumboTron, such as might be seen at an outdoor sports stadium or public place. FIGS. 5H through 5J depict the media projection subsystems of several aircraft presenting complex images. For example, in FIG. 5H the letter "A" is distributed across several adjacent media projection subsystems. If the images are electronic lighted images, the images presented by the media projection subsystems may change, causing the overall billboard image to change, as shown in the transition from FIG. 5H to FIG. 5I. Further, the images of the media projection subsystems, as well as the position matrix alignment of the aircraft may change, as shown in the transition from FIG. 5I to FIG. 5J. Although not explicitly shown, the location of the position matrix may also change with respect to the underlying earth, as shown in the pod transition in FIG. 5D.

As described in greater detail in the explanation of FIG. 1A, the system 500 may include a targeting software application, embedded in a non-transitory memory of the server or aircraft, enabling a sequence of processor executable instructions permitting the selection of the location of the position matrix from a plurality of potential position matrix locations. Each potential position matrix location may have a corresponding weighted value, and an entity associated with the aircraft, identification code, or server may receive a reward corresponding to the value of the selected position matrix location. The targeting application may be embedded with a controller aircraft, which relays instructions to the other aircraft. Otherwise, the targeting application may be embedded with a server and instructions are relayed through a controller aircraft, or sent directly to each individual aircraft. Finally, each individual aircraft may include its own independent targeting application.

Returning to FIG. 5A, system 500 may further comprise a pod automotive support vehicle 504 for transporting the pod of aircraft 502 to a destination proximately located near the position matrix. The support vehicle 504 may comprise a charging subsystem 506 with charging stations for the aircraft 102. The support vehicle 504 may include a location subsystem 508 to determine the destination location. Examples of locations subsystems have been provided above. The support vehicle may also include a communications subsystem 510 having an interface to antenna 512 to transmit the destination location to the pod of aircraft 502. Examples of communication subsystems have been provided above. The communications subsystem 510 may be used to upload aircraft verification information, the destination location, aircraft health status (e.g., charge), or recorded images to a server, for example. In another aspect, the support vehicle 504 further comprises a recording subsystem 514 including a camera 516 to record the summed display matrix image billboard or the position of individual aircraft 102, such as might be of value for calibration purposes. The images can, alternatively, be stored in local memory or downloaded to a server. In another aspect, the support vehicle may further comprise a server 518 with an associated non-transitory memory (not shown). In one aspect, one or more of the aircraft may include a camera to record the billboard image and/or record crowd reaction to the billboard.

In one aspect, the system 500 may incorporate the use of ranger aircraft 520 or ground stations 522 whose purpose is to track changing weather conditions, such as wind speed, wind direction, temperature, and air pressure. The ranger aircraft 520 or ground station 522 supply an environmental report of these conditions so that the aircraft in the pod 502 have advance warning of variables that may affect the ability of the aircraft 102 to maintain precise locations. The ground station 522 may be incorporated with the pod support vehicle. The ranger aircraft 520 may be removed from the rest of the aircraft in the pod, as shown, perhaps positioned to the prevailing wind to provide advanced warning of wind changes. Alternatively, the ranger aircraft may be embedded with the rest of the pod, and may be equipped with a media projection subsystem. In one aspect, each aircraft may incorporate an environmental sensor. The environmental report may be sent to the pod support vehicle and then relayed individually to the aircraft, or relayed to a control aircraft for subsequent distribution. Depending on the control system used, the aircraft make position adjustments individually, or follow position adjustment instructions from the control aircraft or the pod support vehicle.

As noted above in the explanation of FIG. 1A, the aircraft may be equipped with IMUs. As an alternative, or in addition to receiving environmental reports, the aircraft may make position adjustments in response to IMU measurements. Again, the position adjustments may be made on an individual aircraft basis, coordinated by a controller aircraft, or even by a ground based server. A Kalman filter embedded with the individual aircraft, controller aircraft, or even a ground based server may aid in processing the IMU data.

The systems described above can be adapted for use in a model where an advertiser pays for service based upon performance. For example, an advertising client may contract with a system provider stipulating a target market and deployment hours/rate. The system provider determines geo-fenced locations that meet or exceed the advertiser's target market based on location, demographics, traffic, population density, and other variables. Platform deployment time, location, quality code, and user information are recorded by the server. A system provider algorithm determines platform performance based on length of deployment, contracted rate, maintenance cost reimbursement, and location quality code.

The systems described above support a targeted mobile sign system, where the mobile sign is selectively deployed. As explained above, a publically accessible WLAN access point is also provided. In cooperation with the deployment of the sign, an organization or user associated with the sign is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the sign and/or WiFi has actually been deployed, and once deployed, the location of the system. In some aspects, the sign is a type of visual display, but other aspects may include just an auditory presentation, a combination visual and auditory presentation, or a presentation that is able to interact with a proximate viewer.

In one aspect, the system communicates a deployment message and supporting systems receive the deployment message and determine the deployment location. This information can be relayed in real-time to a server entity. Alternatively, the information can stored in memory of the supporting system and transferred to the server at periodic intervals or upon the attainment of predetermined metrics such as the number of deployments.

Figure 6:
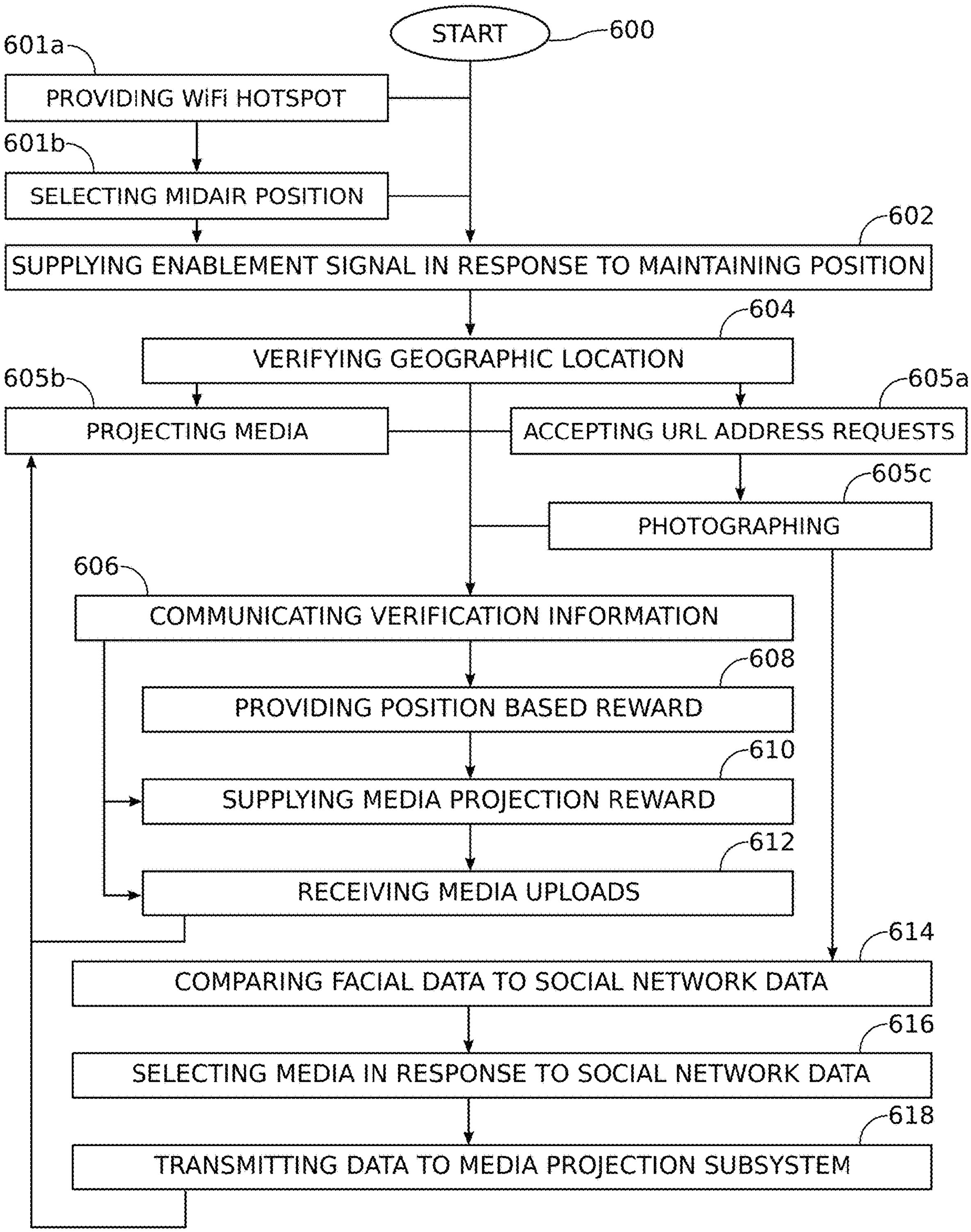
FIG. 6 is a flowchart illustrating a method for aircraft media projection.

FIG. 6 is a flowchart illustrating a method for aircraft media projection. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 600.

Step 602 supplies an enablement signal with an identification code, in response to an aircraft maintaining a selected midair position in the atmosphere above the ground. The selected midair position may be a stationary position or a flight path (moving position). Step 604 verifies the midair geographic location of the aircraft. In some aspects, Steps 602 and 604 are performed simultaneously. Step 606 communicates verification information including the enablement signal, identification code, and geographic location, to a server. Alternatively, the verification information is stored in an aircraft local memory. In one aspect, Step 601*a* provides a publically accessible WLAN IEEE 802.11 (WiFi) hotspot attached to the aircraft. In Step 605*a* the WiFi hotspot accepts URL address requests from a user device proximately located to the geographic location. Then, communicating verification information in Step 606 includes communicating the URL address requests to a DNS service, which may be embedded with the server.

In another aspect, Step 601*b* selects the midair position from a plurality of potential midair positions having corresponding weighted values. Step 608 provides a reward to an entity associated with the aircraft responsive to the value of the selected midair position. Alternatively, the rewards may be based upon WLAN traffic density.

In one variation, Step 605*b* projects media from a media projection subsystem attached to the aircraft, which may be a displayed image, broadcast sound, or both. For example, the media may be projected by rotating the media projection subsystem around a vertical z axis in a selected midair stationary position. If the media projection subsystem is selectively enabled, that is, if the media is selectively projected, Step 610 supplies a reward to an entity associated with the aircraft when the media projection subsystem is enabled. In one aspect, in Step 612 the media projection subsystem receives media uploads from the server for projection.

In another variation, Step 605*c* photographs images of a geographic location proximate to the aircraft. Then, communicating verification information in Step 606 includes communicating the images to the server. Optionally, in Step 614 a facial recognition software application, stored in a non-transitory memory of the server, enables a sequence of processor executable instructions for comparing the received camera images to facial data, and cross-referencing recognized facial data to associated publically available social network data. As another option, in Step 616 the facial recognition application selects media in response to the social network data. The media may include commercial goods or services known to be associated with a URL address or an entity's publically stated preferences and buying habits. In Step 618 the server transmits the media to the media projection subsystem, and in Step 620 the media projection subsystem attached to the aircraft projects the media uploads. In a manner similar to a Wireless Sensor Network (WSN), which collects environmental data from a group of dispersed sensors, the system described herein can be adapted to collect social data or for marketing.

Figure 7:
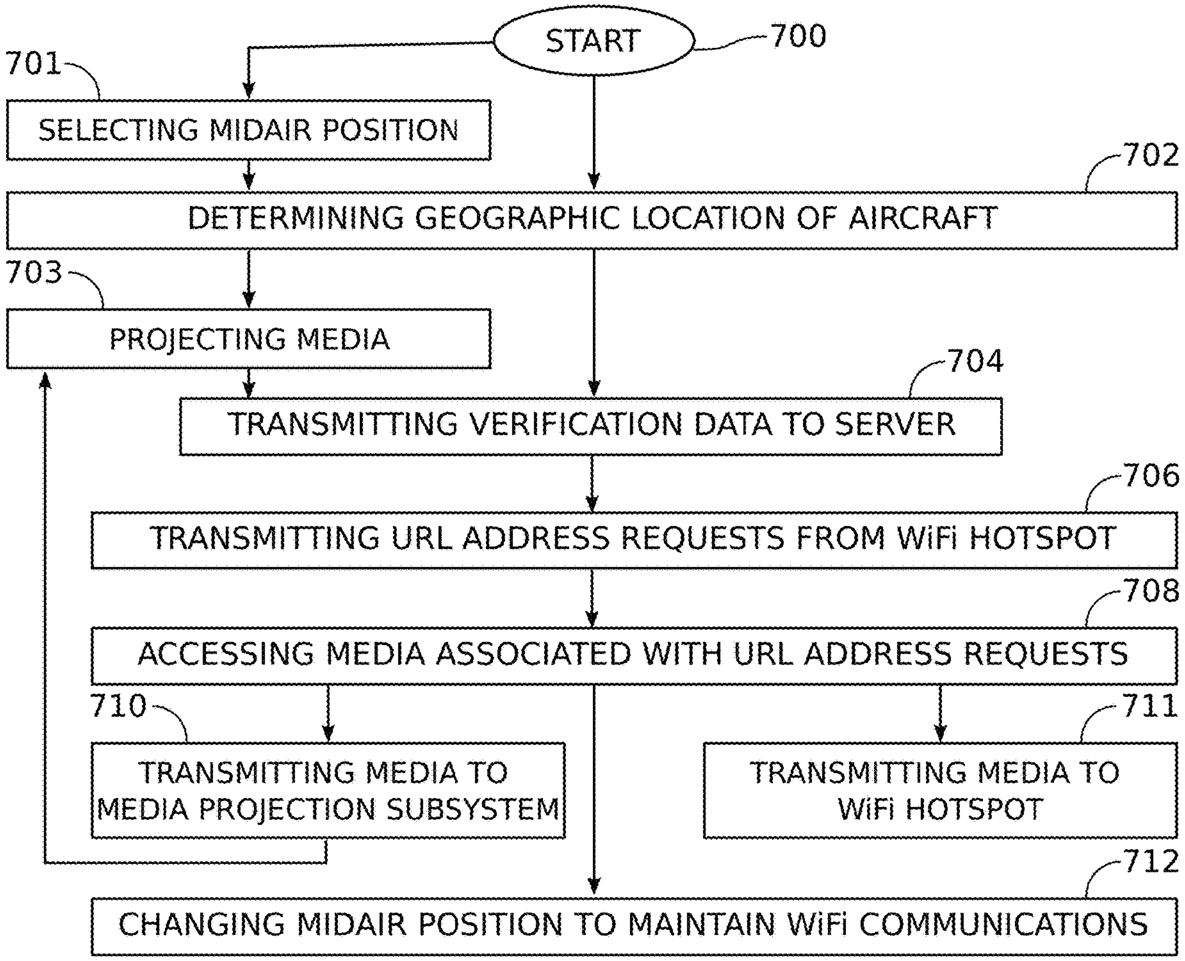
FIG. 7 is a flowchart illustrating an aerial communication method.

FIG. 7 is a flowchart illustrating an aerial communication method. The method starts at Step 700. In Step 702 a location subsystem attached to an aircraft determines the midair geographic location of the aircraft, which may be a stationary position or a moving flight path. In Step 704 a communications subsystem attached to the aircraft transmits verification information including the geographic location to a server. In Step 706 a WLAN IEEE 802.11 (WiFi) hotspot attached to the aircraft accepts URL address requests from a user device, and transmits the URL address requests, via the communications subsystem, to a DNS service.

In one aspect, in Step 703 a media projection subsystem attached to the aircraft projects media. In Step 708 a media searcher application, stored in a non-transitory memory of the server and enabled as a sequence of processor instructions, accesses media associated with URL addresses. Step 710 transmits the accessed media to the media projection subsystem. Alternatively, Step 711 transmits the accessed media to the WiFi hotspot for uploading to a connected user device (e.g., a smartphone). In another aspect, in Step 706 the WiFi hotspot receives a URL address request from a first user device, and in Step 712 the aircraft changes midair position so as remain in WiFi communication with the first user device.

In one variation, in Step 701 a targeting software application, stored in a non-transitory memory, enables a sequence of processor executable instructions permitting the selection of the midair position from a plurality of potential midair positions, which may have corresponding weighted values. Optionally, an entity associated with the aircraft, the server, or the WiFi hotspot receives a reward in Step 714 corresponding to the value of the selected midair position.

Figure 8:
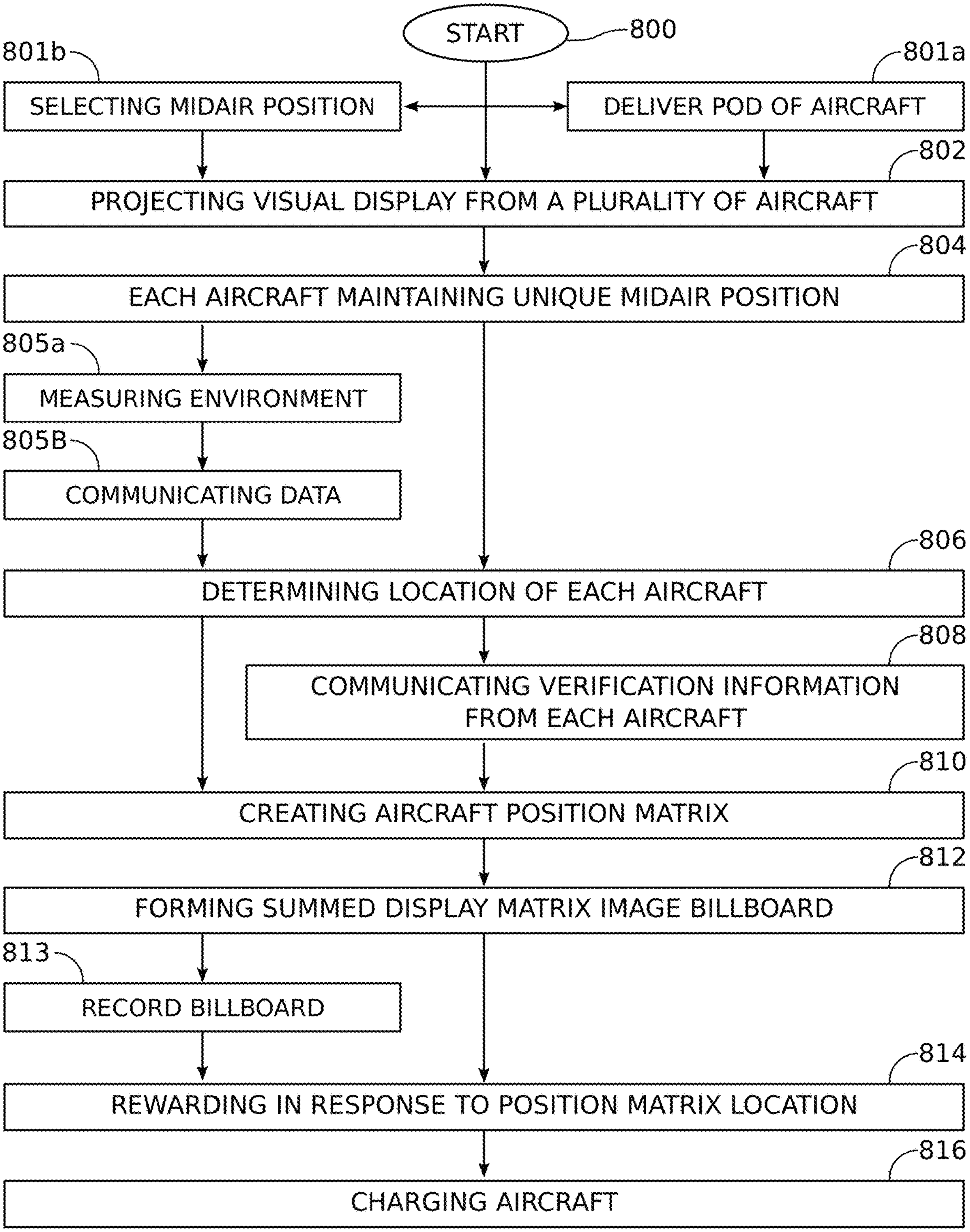
FIG. 8 is a flowchart illustrating an aerial billboard method.

FIG. 8 is a flowchart illustrating an aerial billboard method. The method begins with Step 800. In Step 802 a visual display is projected from each aircraft in a pod made up of a plurality of aircraft. In addition to each aircraft projecting a consistent, non-changing display image, it should also be understood that some or all of the aircraft may project a changing medium (display image), so as to present a movie or video like image. Further, some or all of the aircraft may receive uploaded media, so that the projected media can be updated on-the-fly.

In Step 804 each aircraft supplies an enablement signal with an identification code, in response to maintaining a unique midair position. In Step 806 a location subsystem attached to each aircraft determines the midair geographic location of the aircraft. In Step 808 a communications subsystem attached to each aircraft transmits verification information including the enablement signal, identification code, and geographic location. The verification information can be collected by a server, handheld controller, or smartphone application. Optionally, Step 808 can be bypassed. No verification information is sent based upon the assumption that the aircraft are projecting media in Step 802 and the aircraft are correctly positioned in Step 806. In one aspect, verification is performed using camera images taken by one of the aircraft or by a ground source. In one aspect, one of the aircraft from the plurality of aircraft takes on the role of collecting data from the other aircraft. Optionally, this controller aircraft may be communication with a server or support vehicle, acting as a relay for data collection and instructions. Alternatively, each aircraft may act independently of a central controller aircraft or a (land-based) server. In Step 810 the plurality of aircraft forms a position matrix with each aircraft midair position assigned with respect to adjacent aircraft midair positions. In Step 812 the combined plurality of aircraft visual displays form a summed display matrix image billboard. In one aspect, Step 806 uses IMUs to make inertial measurements to aid in determining the precise midair positions of the aircraft. The IMU measurements can be made by a central controller aircraft who distributes coordinated position adjustment instructions to the pod, or each aircraft can be equipped with an IMU to made independent position adjustments. In another aspect, a ranger aircraft in Step 805*a* makes measurements in the environment near the position matrix that are communicated to the pod in Step 805*b*, to aid in determining the aircraft midair positions in Step 806. Step 805*b* may communicate the environmental data individually to aircraft in the pod. Alternatively, to coordinate movement, the environmental data is sent to a central controller aircraft or ground based server, who then supply instructions to the pod. As another alternative, each aircraft makes independent environmental measurements that are used in determining their midair positions in Step 806.

In one aspect, each aircraft in Step 804 maintains one of the following midair positions: stationary, varying with respect to adjacent aircraft midair positions, as a component in a group flight path where aircraft maintain constant midair positions with respect to adjacent aircraft, or as a component in a group flight path with midair positions that vary with respect to adjacent aircraft.

In another aspect, in Step 801*a* a targeting software application, stored in a non-transitory memory, enables a sequence of processor executable instructions permitting the selection of the location of the position matrix from a plurality of potential position matrix locations, which may have corresponding weighted values. In one aspect, one aircraft provides location instructions to the other aircraft in the group. Optionally, in Step 814 a first entity associated with the identification codes or aircraft receives a reward corresponding to the value of the selected position matrix location.

In one aspect, in Step 801*b* an automotive support vehicle delivers the pod of aircraft to a destination near the position matrix. In Step 816 the pod of aircraft location return to the support vehicle for charging and/or media uploads. In another aspect, in Step 813 the support vehicle uses a camera to record the summed display matrix image billboard or the positions of individual aircraft.

Systems and methods have been provided for monitoring the deployment of media and the occupation of midair geographic locations. Examples of particular message structures, schematic block linkages, and hardware units have been presented to illustrate the invention. However, the invention is not limited to merely these examples. Other variations and embodiments of the invention will occur to those skilled in the art.

We claim:

1. An aircraft media system with two control modes, the system comprising:

a location selection mode comprising:

a targeting software application stored in a non-transitory memory, enabling a sequence of processor executable instructions permitting a first entity to select a midair position of an aircraft from a plurality of potential positions;

a location subsystem, configured for attachment to the aircraft, to determine the midair geographic location of the aircraft;

a reporting mode comprising:

a deployment subsystem, configured for attachment to the aircraft, having an interface to supply an enablement signal with an identification code, in response to the aircraft maintaining the selected midair position in the atmosphere above the ground; and, a communications subsystem, configured for attachment to the aircraft, having an interface to receive verification information including the enablement signal, identification code, and geographic location of the selected midair position, and an interface to transmit the verification information to a server's service client entity, different than the first entity, proving the maintenance of the selected midair position.

2. The system of claim 1 further comprising:

a publically accessible Wireless Local Area Network (WLAN) IEEE 802.11 hotspot configured for attachment to the aircraft.

3. The system of claim 1 wherein each potential midair position has a corresponding weighted value.

4. The system of claim 3 wherein the identification code is associated with the first entity; and, wherein the first entity receives a reward corresponding to the value of the selected midair position.

5. The system of claim 4 further comprising:

a selectively enabled media projection subsystem, configured for attachment to the aircraft, having an interface to project media;

wherein the identification code is associated with the first entity; and, wherein the deployment system supplies the enablement signal in response to the media projection subsystem being enabled.

6. The system of claim 1 wherein the midair position is selected from the group consisting of a stationary position and a flight path.

7. The system of claim 1 further comprising:

a media projection subsystem, configured for attachment to the aircraft, having an interface to project media.

8. The system of claim 7 wherein the media projection subsystem projects media selected from the group consisting of a displayed image, broadcast sound, or a combination thereof.

9. The system of claim 7 wherein the communications subsystem receives media uploads from the server; and, wherein the communications subsystem provides the media uploads to the media projection subsystem.

10. The system of claim 7 further comprising:

a camera, configured for attachment to the aircraft, having an output to supply images of a proximate geographic location to the communications subsystem; and, wherein the communications subsystem transmits the images to the server;

the system further comprising:

a facial recognition software application stored in a non-transitory memory of the server, enabling a sequence of processor executable instructions for:

comparing the received camera images to facial data;

cross-referencing recognized facial data to associated publically available social network data;

selecting media in response to the social network data;

transmitting the selected media to the aircraft communications subsystem;

wherein the communications subsystem receives the selected media from the server; and, wherein the communications subsystem provides the selected media to the media projection subsystem.

11. The system of claim 1 further comprising:

a camera, configured for attachment to the aircraft, having an output to supply images of a proximate geographic location to the aircraft; and, wherein the communications subsystem transmits the images to the server.

12. The system of claim 1 further comprising:

a camera, configured for attachment to the aircraft, having an output to supply images of a proximate geographic location to the aircraft; and, wherein the communications subsystem transmits the images to the server;

the system further comprising:

a facial recognition software application stored in a non-transitory memory of the server, enabling a sequence of processor executable instructions for:

comparing the received camera images to facial data; and, cross-referencing recognized facial data to associated publically available social network data.

13. The system of claim 1 further comprising:

an aircraft pod including a plurality of aircraft, with each aircraft comprising a media projection subsystem visual display, and supplying an enablement signal in response to maintaining a unique midair position;

wherein the pod of aircraft forms a position matrix with each aircraft midair position assigned with respect to adjacent aircraft midair positions; and, wherein the combined pod of aircraft visual displays forms a summed display matrix image billboard.

14. An aerial billboard system comprising:

an aircraft pod including a plurality of aircraft, each aircraft comprising two control modes including:

a location selection mode comprising:

a targeting software application stored in a non-transitory memory, enabling a sequence of processor executable instructions permitting a first entity to select a midair position of an aircraft from a plurality of potential positions;

a location subsystem to determine the midair geographic location of the aircraft;

a reporting mode comprising:

a deployment subsystem having an interface to supply an enablement signal with an identification code, in response to an aircraft maintaining a unique midair position;

each aircraft further comprising;

a media projection subsystem having an interface to project a visual display;

a communications subsystem, configured for attachment to the aircraft, having an interface to receive verification information including the enablement signal, identification code, and geographic location of the selected midair position, and an interface to transmit the verification information to a server's service client entity, different than the first entity, proving the maintenance of the selected midair position;

wherein the pod of aircraft forms a position matrix with each aircraft midair position assigned with respect to adjacent aircraft midair positions; and, wherein the combined pod of aircraft visual displays forms a summed display matrix image billboard.

15. The system of claim 14 wherein each aircraft maintains a midair position selected from the group consisting of stationary, varying with respect to adjacent aircraft midair positions, as a component in a group flight path where aircraft maintain constant midair positions with respect to adjacent aircraft, or as a component in a group flight path with midair positions that vary with respect to adjacent aircraft.

16. The system of claim 14 wherein the first entity receives a reward corresponding to a weighted value of the selected position matrix location.

17. The system of claim 14 wherein at least one aircraft in the pod of aircraft further comprises an Inertia Measurement Unit (IMU); and, wherein the aircraft midair positions are modified in response to IMU measurements.

18. The system of claim 14 wherein the aircraft pod includes a ranger aircraft comprising environmental sensors; and, wherein the aircraft midair positions are modified in response to environmental sensor measurements.

* * * * *